United States Patent
Yoshikawa

(10) Patent No.: US 8,303,206 B2
(45) Date of Patent: Nov. 6, 2012

(54) INK COMPOSITION FOR WRITING TOOL AND WRITING TOOL

(75) Inventor: Masafumi Yoshikawa, Tokyo (JP)

(73) Assignee: Zebra Co., Ltd., Tokyo (JP)

( * ) Notice: Subject to any disclaimer, the term of this patent is extended or adjusted under 35 U.S.C. 154(b) by 477 days.

(21) Appl. No.: 12/625,873

(22) Filed: Nov. 25, 2009

(65) Prior Publication Data

US 2010/0135711 A1    Jun. 3, 2010

(30) Foreign Application Priority Data

Dec. 1, 2008 (JP) ................. P2008-306578

(51) Int. Cl.
*B43K 7/00* (2006.01)
(52) U.S. Cl. .......... 401/209; 106/31.65; 106/31.95
(58) Field of Classification Search .......... 401/208, 401/209, 215, 216; 106/31.28, 31.58, 31.68, 106/31.86, 31.6, 31.65, 31.9, 31.95
See application file for complete search history.

(56) References Cited

U.S. PATENT DOCUMENTS

| 6,099,629 | A | 8/2000 | Morita et al. |
| 6,422,776 | B1 * | 7/2002 | Nakatani ............... 401/216 |
| 7,297,730 | B2 * | 11/2007 | Hattori et al. ............ 523/161 |
| 7,322,767 | B2 | 1/2008 | Asami ................. 401/216 |
| 7,441,976 | B2 * | 10/2008 | Kitaoka et al. ........... 401/209 |
| 7,600,937 | B2 * | 10/2009 | Yoshikawa .............. 401/216 |

FOREIGN PATENT DOCUMENTS

| EP | 0 903 384 | 3/1999 |
| EP | 0 987 304 | 3/2000 |
| EP | 1 111 018 | 6/2001 |
| JP | 3221846 | 8/2001 |
| JP | 3789198 | 4/2006 |

OTHER PUBLICATIONS

EP Search Report mailed on Feburary 16, 2010 directed at application No. 09177487.7; 6 pages.

* cited by examiner

*Primary Examiner* — David Walczak
(74) *Attorney, Agent, or Firm* — Morrison & Foerster LLP

(57) ABSTRACT

The writing tool 100 having an ink composition for a writing tool 12 in an ink holding tube 14, the ink composition for a writing tool 12 containing a metal powder, a gelling agent and spherical resin fine particles, wherein the viscosity (V1) at a shear rate of 1000 s$^{-1}$ is no greater than 45 mPa·s and the viscosity (V2) at a shear rate of 0.01 s$^{-1}$ is at least 100 Pa·s.

7 Claims, 3 Drawing Sheets

INK COMPOSITION FOR WRITING TOOL AND WRITING TOOL

BACKGROUND OF THE INVENTION

1. Field of the Invention

The present invention relates to an ink composition for a writing tool and to a writing tool.

2. Related Background Art

A variety of colors are realized in ink compositions for writing tools, by the use of various dyes and pigments. Ink compositions with metallic colors obtained by including metal powders, and writing tools comprising such ink compositions, have been proposed in recent years in Japanese Patent Publication No. 3221846 (hereinafter referred to as "document 1") and Japanese Patent Publication No. 3789198 (hereinafter referred to as "document 2").

Because ink compositions containing such metal powders contain solid metal powder, problems have been faced including writing problems such as ink bleed-out and writing thin spots, settling of the metal powder during storage or use causing separation of the ink composition, clogging of the pen point or alteration in color tone with passage of time.

In order to avoid these problems, certain proposals have involved specifying the clearance size between the ball and ball-holding chamber in the ball-point pen tip structure (document 1), or including an alkali of an unsaturated fatty acid as a specific component (document 2).

SUMMARY OF THE INVENTION

According to investigation by the present inventors, however, it has been found to be difficult to maintain satisfactory discharge properties for metallic-colored ink compositions containing a metal powder, even if a specific structure is prescribed for the tip structure of a ball-point pen or if specific components are added to the ink composition.

For example, when the ink channel of a writing tool is widened to increase the clearance in order to draw thick metallic-colored writing lines, it becomes necessary to increase the viscosity of the ink composition in order to prevent blotting of the ink. When this is done, however, the discharge property of the ink composition is impaired and thin spots tend to occur during initial writing. When such an ink composition is filled into a writing tool with a small clearance, the discharge property of the ink composition during writing is impaired.

On the other hand, if the viscosity of the ink composition is lowered to prevent the initial thin spots or impairment of the discharge property, the metal powder in the ink composition tends to settle causing sedimentation and separation, as mentioned above, which results in clogging or alteration of the color tone over time.

The present invention has been accomplished in light of these circumstances, and its object is to provide an ink composition for a writing tool that exhibits both an excellent discharge property and high stability over time, as well as a writing tool that produces no initial thin spots and allows drawing of stable, clear writing lines.

In order to achieve this object, there is provided according to the invention an ink composition for a writing tool that comprises a metal powder, a gelling agent and spherical resin fine particles, wherein the viscosity (V1) at a shear rate of 1000 $s^{-1}$ is no greater than 45 mPa·s and the viscosity (V2) at a shear rate of 0.01 $s^{-1}$ is at least 100 Pa·s.

The ink composition for a writing tool of the invention comprises a metal powder, but it also comprises a gelling agent and spherical resin fine particles, and has values within the specified ranges for the viscosity V1 and V2 measured under different shear rate conditions. Since the viscosity (V1) at a shear rate of 1000 $s^{-1}$ is no greater than 45 mPa·s, the discharge property of the ink composition during writing is satisfactory, and writing can be accomplished with sufficient clarity without initial thin spots, for both thick writing lines and thin writing lines. Furthermore, since the viscosity (V2) at a shear rate of 0.01 $s^{-1}$ is at least 100 Pa·s, it is possible to adequately inhibit settling of the metal powder during storage and writing, so that the stability over time is excellent. In other words, the ink composition of the invention has been accomplished based on particular knowledge of the present inventors that two viscosities at different shear rates may be specified to solve the problems characteristic of metallic inks, namely the obstruction and settling caused by adding the metal powder, and as a result it is possible to provide an ink composition having both an excellent discharge property and stability over time, compared to conventional ink compositions.

The mean particle size of the metal powder in the ink composition of the invention is preferably 5-20 μm. By adding the metal powder having such a mean particle size range, it is possible to more reliably inhibit settling of the metal powder in the ink composition, while maintaining luminance of writing lines. It is thereby possible to obtain an ink composition that exhibits high levels of both writing line luminance and stability over time.

The mean particle size of the spherical resin fine particles in the ink composition of the invention is preferably 0.05-1 μm. This will allow the spherical resin fine particles to adhere onto the surfaces of the metallic particles, thus helping to prevent the metallic particles from adhering to each other and helping to more reliably prevent aggregation of the metal powder. It is thus possible to produce an ink composition with an even more excellent discharge property and stability over time.

According to the invention there is provided a writing tool comprising the aforementioned ink composition for a writing tool. Since such a writing tool is filled with an ink composition with a sufficiently excellent discharge property and shelf life, formation of initial thin spots is adequately inhibited and it is possible to draw writing lines with a consistent metallic luster in a stable manner for prolonged periods.

The writing tool of the invention comprises an ink holding tube and a ball-point pen tip provided at the end of the ink holding tube, and it preferably has the aforementioned ink composition for a writing tool in the ink holding tube. Adjustment of the clearance will thus be possible, to allow stable drawing of writing lines of various thicknesses while adequately preventing initial thin spots.

According to the invention, an ink composition for a writing tool can be provided that exhibits both an excellent discharge property and high stability over time, and a writing tool can also be provided that produces no initial thin spots and allows drawing of stable, clear writing lines.

DESCRIPTION OF THE PREFERRED EMBODIMENTS

Figure 1:
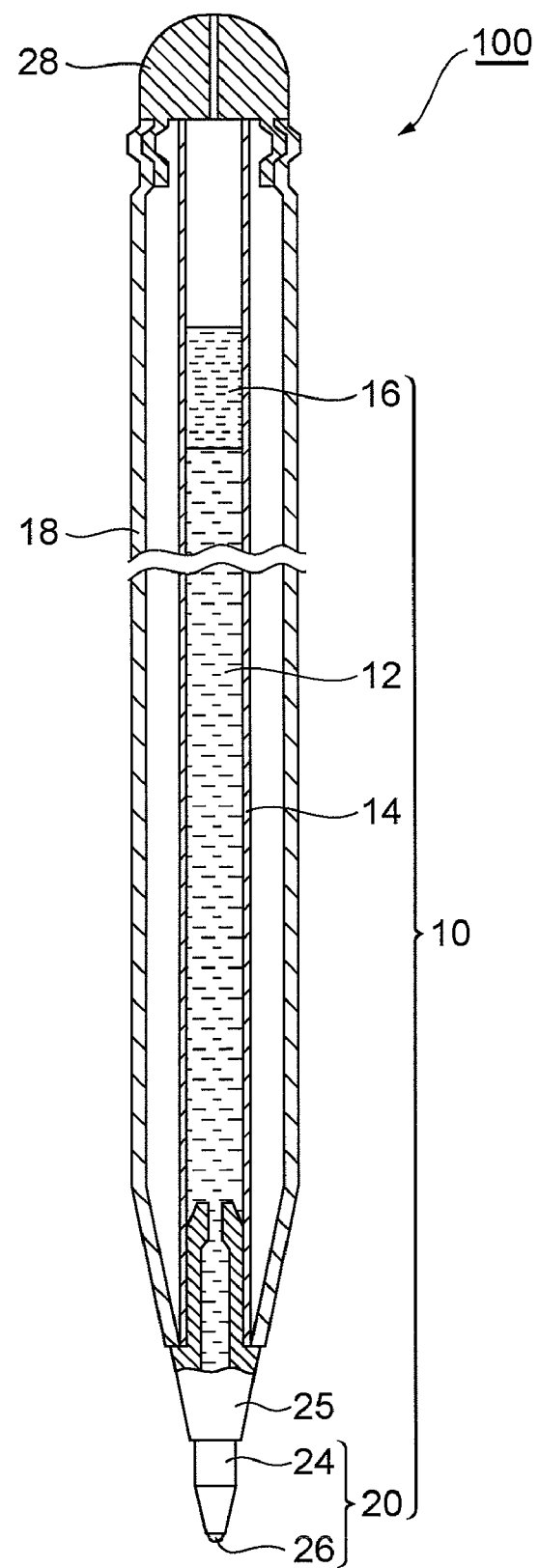
FIG. 1 is a schematic cross-sectional view showing an embodiment of a ball-point pen according to the invention.

Preferred embodiments of the invention will now be explained with reference to the accompanying drawings where necessary. For the drawings, identical or corresponding elements will be referred to by like reference numerals and will be explained only once. Also, the dimensional proportions depicted in the drawings are not necessarily limitative.

The ink composition for a writing tool of this embodiment is a gel ink comprising metal powder, a gelling agent, spherical resin fine particles and other optional components. Each of these components will now be explained in detail.

[Metal Powder]

The metal powder used may be one that has metallic luster and is ordinarily added to ink compositions for writing tools. For example, aluminum powder, bronze powder or the like may be used.

The mean particle size of the metal powder is preferably 3-20 μm and more preferably 3-12 μm. If the mean particle size of the metal powder exceeds 20 μm the ink composition will tend to clog at the pen tip, and if it is less than 3 μn the metallic luster of the writing lines will be impaired, tending to prevent the desired color shade from being obtained. The mean particle size referred to in the present specification is the value measured by laser diffraction scattering using a commercially available measuring apparatus, and it can be determined as D50, which is the 50% diameter in the volume-based particle size distribution.

The form of the metal powder is preferably scaly. This will yield an ink composition with excellent metallic luster as well as superior dispersibility.

The metal powder content is preferably 1-10 parts by mass and more preferably 2-7 parts by mass, with 100 parts by mass as the total of the ink composition. If the content is greater than 10 parts by mass, the solid concentration of the ink composition will become too high, thus tending to result in clogging at the pen tip. If the content is less than 1 part by mass, on the other hand, it will tend to be difficult to draw ink writing lines with sufficient metallic luster.

From the viewpoint of obtaining excellent metallic luster, the metal powder is preferably aluminum powder. A commercially available metal paste comprising metal powder, a petroleum-based solvent and a friction reducing agent such as a fatty acid may be used as the metal powder source for formulation of the ink composition.

[Spherical Resin Fine Particles]

The spherical resin fine particles used may be colored, and they may be commercially available resin particles, for example. There are no particular restrictions on the material thereof, and for example, spherical resin fine particles comprising an acrylic resin, a styrene/acrylic copolymer or a polyolefin may be used. The spherical resin fine particles may be in the form of a powder or an aqueous dispersion. As commercially available spherical resin fine particles, there may be used LUMIKOL (trade name of Nihon Keiko Kagaku), CHEMIPEARL (trade name of Mitsui Chemicals, Inc.), FINESPHERE (trade name of Nippon Paint Co., Ltd.), or the like.

The mean particle size of the spherical resin fine particles is preferably 0.05-1 μm and more preferably 0.1-0.5 μm. If the mean particle size is greater than 1 μm the spherical resin fine particles themselves will tend to settle, thus interfering with satisfactory stability over time, and if it is less than 0.05 μm the metal powder-dispersing effect will be impeded, thus tending to create irregularities in writing lines. This mean particle size is the value measured by laser diffraction scattering using a commercially available measuring apparatus, and it can be determined as D50, which is the 50% diameter in the volume-based particle size distribution.

Since the shapes of the spherical resin fine particles are spherical, they can infiltrate between the metallic particles of the metal powder and prevent adhesion between the metallic particles, thus lowering friction between the metallic particles and resulting in an ink composition with an excellent discharge property.

By adding spherical resin fine particles to the ink composition it is possible to improve the shear thinning property of the ink composition. The spherical resin fine particle content is preferably 2-40 parts by mass and more preferably 5-30 parts by mass, with 100 parts by mass as the total of the ink composition. If the content is greater than 40 parts by mass, the solid concentration of the ink composition will become too high, thus tending to result in clogging at the pen tip. A content of less than 2 parts by mass, on the other hand, will impede the metal powder-dispersing effect, thus tending to create irregularities in writing lines.

[Gelling Agent]

The gelling agent is not particularly restricted so long as it is one ordinarily used in ball-point pen aqueous gel inks. As examples of gelling agents there may be mentioned natural agents such as xanthan gum, guar gum, locust bean gum, carrageenan, gum arabic, tragacanth gum, alginic acid, gelatin, agar, casein, psyllium seed gum and tamarind seed gum, and synthetic agents such as methylcellulose, ethylcellulose, hydroxyethylcellulose, carboxymethylcellulose, carboxymethylcellulose sodium, sodium alginate, polyvinylpyrrolidone, polyvinyl alcohol, polyvinyl methyl ether, sodium polyacrylate and carboxyvinyl polymer. These may be used as single compounds or as combinations of two or more compounds.

The gelling agent content is preferably 0.1-3 parts by mass and more preferably 0.2-1 part by mass, with 100 parts by mass as the total of the ink composition. If the content is greater than 3 parts by mass, the viscosity of the ink composition will become too high, thus tending to result in clogging at the pen tip. A content of less than 0.1 part by mass, on the other hand, will excessively lower the viscosity of the ink composition, tending to interfere with sufficient dispersibility of the metal powder.

The ink composition of this embodiment may also contain a rust-preventive agent, antiseptic agent (mildewproofing agent), lubricant, humectant, pH regulator or the like in addition to the components mentioned above. As rust-preventive agents there may be used benzotriazole and its derivatives, tolyltriazole, dicyclohexylammonium nitrite, diisopropylammonium nitrite, sodium thiosulfate, ethylenediaminetetraacetic acid salts, octyl phosphate, imidazoles, benzoimidazoles, saponins, dialkylthioureas and the like. The rust-preventive agent content is preferably 0.3-5 parts by mass and more preferably 0.5-3 parts by mass, with 100 parts by mass as the total of the ink composition.

As antiseptic agents (mildewproofing agents) there may be used carbolic acid, 1,2-benzisothiazolin-3-one sodium salt, sodium benzoate, sodium dehydroacetate, potassium sorbate, propyl paraoxybenzoate, 2,3,5,6-tetrachloro-4-(methylsulfonyl)pyridine and the like. The antiseptic agent content is preferably 0.1-5 parts by mass and more preferably 0.1-1 part by mass, with 100 parts by mass as the total of the ink composition.

As lubricants there may be used higher fatty acids such as oleic acid, nonionic surfactants with long-chain alkyl groups, polyether-modified silicone oil, thiophosphorous acid triesters such as thiophosphorous acid tri(alkoxycarbonylmethyl ester) or thiophosphorous acid tri(alkoxycarbonylethyl ester), phosphoric acid monoesters of polyoxyethylenealkyl ethers or polyoxyethylenealkylaryl ethers, phosphoric acid diesters of polyoxyethylenealkyl ethers or polyoxyethylenealkylaryl ethers, or metal salts, ammonium salts, amine salts and alkanolamine salts of the foregoing. The lubricant content is preferably 0.3-5 parts by mass and more preferably 0.5-3 parts by mass, with 100 parts by mass as the total of the ink composition.

As humectants there may be used ethylene glycol, diethylene glycol, triethylene glycol, polyethylene glycol, propylene glycol, ethyleneglycol monomethyl ether, glycerin, pyrrolidone, urea, thiourea, ethyleneurea, sorbitol, mannitol, sucrose, glucose, reduced starch hydrolysate, sodium pyrophosphate and the like. The humectant content is preferably 1-30 parts by mass and more preferably 5-20 parts by mass, with 100 parts by mass as the total of the ink composition.

The ink composition of this embodiment may further contain fluorine-based surfactants to improve the permeability of the solvent, or nonionic surfactants, anionic surfactants, cationic surfactants, antifoaming agents such as dimethylpolysiloxane, pH regulators or water.

As pH regulators there may be used inorganic salts such as sodium carbonate, sodium phosphate, sodium hydroxide and sodium acetate, or organic basic compounds including water-soluble amine compounds such as triethanolamine and diethanolamine. The water content is preferably 20-60 parts by mass and more preferably 40-60 parts by mass, with 100 parts by mass as the total of the ink composition.

The ink composition of this embodiment has an excellent shear thinning property. Specifically, for the viscosity (measuring temperature: 20° C.) of the ink composition, the viscosity (V1) at a shear rate of $1000\ s^{-1}$ is no greater than 45 mPa·s, preferably no greater than 35 mPa·s and more preferably no greater than 30 mPa·s. If V1 is no greater than 35 mPa·s it will be possible to obtain an ink composition with a more excellent discharge property, and if V1 is no greater than 30 mPa·s it will be possible to obtain an ink composition with an even more excellent discharge property.

The viscosity (V2) at a shear rate of $0.01\ s^{-1}$ is at least 100 Pa·s, preferably at least 120 Pa·s and more preferably at least 130 Pa·s. If V2 is at least 120 Pa·s it will be possible to obtain an ink composition with more excellent stability over time, and if V2 is at least 130 Pa·s it will be possible to obtain an ink composition with even more excellent stability over time.

Thus, from the viewpoint of achieving an even higher level of both an excellent discharge property and excellent stability over time, the ink composition of this embodiment preferably has a V1 of no greater than 35 mPa·s and a V2 of at least 120 Pa·s, and more preferably a V1 of no greater than 30 mPa·s and a V2 of at least 130 Pa·s.

The viscosities V1, V2 of the ink composition of this embodiment can be measured using a commercially available viscometer, at a temperature of 20° C. and after maintaining a prescribed shear rate for 2 minutes.

The ink composition of this embodiment may be produced by mixing each of the aforementioned components using, for example, a stirrer such as a dissolver, Henschel mixer or homomixer. The stirring conditions for the stirrer are not particularly restricted, and for example, a dissolving agitator may be used for stirring for 30-180 minutes at a rotational speed of 100-1000 rpm, to obtain an ink composition having the metal powder dispersed in a sufficiently homogeneous manner.

Preferred embodiments of the writing tool of the invention will now be explained. FIG. 1 is a schematic cross-sectional view showing the ball-point pen of this embodiment. In the ball-point pen 100 shown in FIG. 1, an ink composition 12 is filled into an ink holding tube 14. A ball-point pen tip 20 is provided at one end of the ink holding tube 14. The ball-point pen tip 20 is composed of a ball holder 24 and a ball 26 held in a rotatable manner by the ball holder 24, and the ink holding tube 14 is anchored by a joint 25. A backflow preventer 16 is housed adjacent to the ink composition 12 in the ink holding tube 14, opposite the ball-point pen tip 20 end. The backflow preventer 16 is situated in such a manner that no gap is formed between it and the ink composition 12.

In this ball-point pen 100, a core 10 is formed by the ink holding tube 14, joint 25, ball-point pen tip 20, ink composition 12 and backflow preventer 16, and the core 10 is mounted on a main body axis 18, while a breech-block 28 with an open hole is attached to the back end of the main body axis 18 (the end opposite the ball-point pen tip 20).

The constituent elements of the ball-point pen 100 will be described below, but except for the ink composition 12, common constituent elements ordinarily used in ball-point pens may be applied to this construction. An ink composition according to the embodiment described above is used for the ink composition 12.

The ink holding tube 14 may be made of a resin such as polypropylene, polyethylene, polyethylene terephthalate, nylon, polyacetal, polycarbonate or the like, or it may be made of metal. There are no particular restrictions on the shape of the ink holding tube 14, and a cylindrical shape, for example, may be employed.

The backflow preventer 16 has a function of preventing outflow of the ink composition (outflow preventing function) and a function of preventing dry-up of the ink composition (sealing function), and any known backflow preventer having such functions may be used without any particular restrictions. The backflow preventer 16 may comprise a base oil and a thickener, for example. As base oils there may be mentioned mineral oils, polybutene, silicon oil, glycerin, polyalkylene glycol and the like. As thickeners there may be mentioned metal soap-based thickeners, organic thickeners, inorganic thickeners and the like.

Preferably, the viscosity of the backflow preventer 16 and the difference in specific gravity of the ink composition 12 and backflow preventer 16 are adjusted so that the backflow preventer 16 does not accumulate in the ink composition 12 when the ball-point pen tip 20 is pointing downward. The backflow preventer 16 preferably has a composition that is immiscible with the ink composition 12.

A member made of a plastic material such as polypropylene, for example, may be used for the main body axis 18 and breech-block 28.

The joint 25 may be made of, for example, polypropylene, polyethylene, polyethylene terephthalate, nylon, polyacetal, polycarbonate or the like.

The joint 25, and the ball holder 24 and ball 26 in the ball-point pen tip 20, may be ones that are commonly used in ball-point pens. The diameter of the ball 26 is preferably 0.3-1.2 mm.

An ink composition 12 according to the invention is filled into the ink holding tube 14 of the ball-point pen 100. Since the ink composition 12 exhibits both an excellent discharge property and high stability over time, the ball-point pen 100 produces no initial thin spots and allows drawing of stable, clear writing lines with metallic luster.

Figure 2:
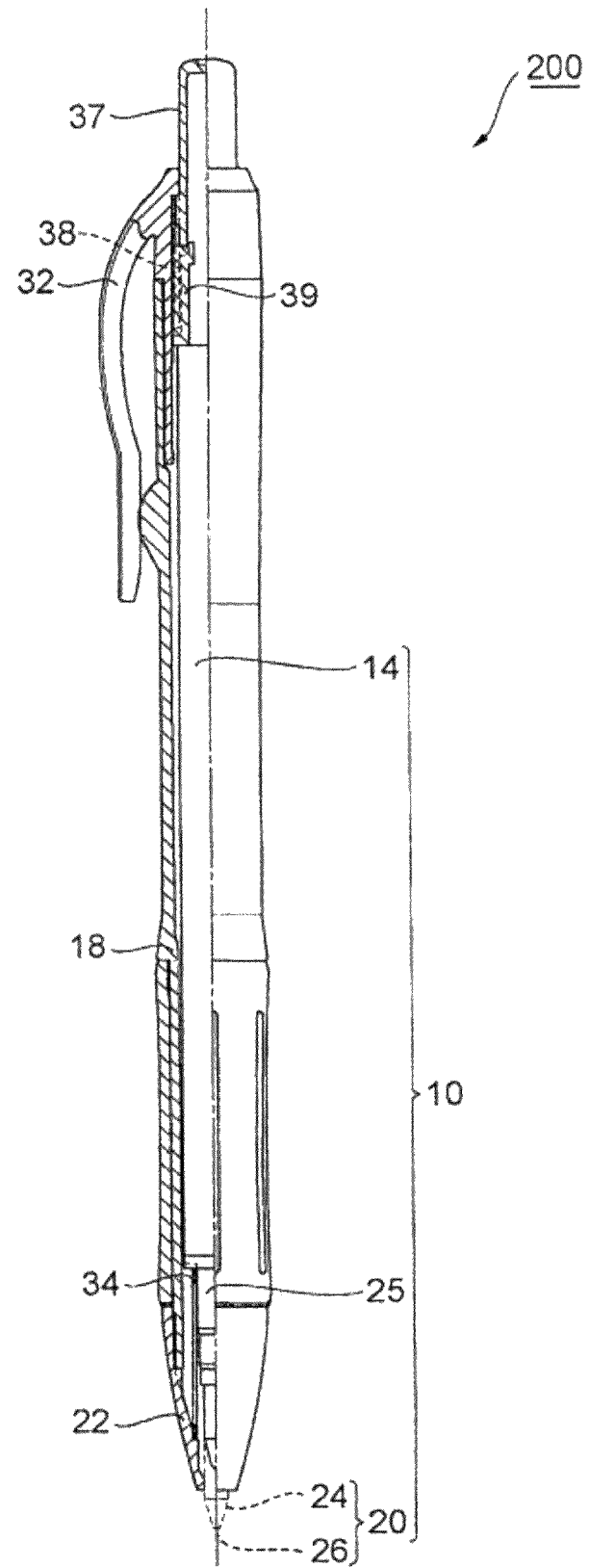
FIG. 2 is a schematic view showing a cutout of part of a ball-point pen according to a different embodiment of the invention.

Another embodiment of the writing tool of the invention will now be described. FIG. 2 is a schematic view showing a cutout of part of a ball-point pen according to a different embodiment of the invention. Except for the ink composition housed in the ink holding tube 14 of the ball-point pen 200, an common construction employed for ordinary knock-type ball-point pens may be applied to this construction, as explained hereunder.

The ball-point pen 200 is a knock-type ball-point pen having a clip 32 at the back end of the main body axis 18 and having the core 10 housed in a pulled-back state by a spring 34 (coil spring) inside the main body axis 18. When the back end (knock actuator 37) of the main body axis 18 is actuated forward, the action of a rotor 39 and middle piece 38 causes the ball-point pen tip 20 to protrude outward through the hole of a tip member 22 formed on the tip of the main body axis 18, as indicated by the dotted lines in FIG. 2.

The core 10 comprises a ball-point pen tip 20 at its tip, having a ball 26 and a ball holder 24 that holds the ball 26 in a rotatable manner, a joint 25 at the front end of which the ball-point pen tip 20 is anchored, and an ink holding tube 14 at the end opening of which the joint 25 is anchored. The back end of the ink holding tube 14 and the hole (opening) of the tip member 22 are connected as an air stream passageway. Inside the ball-point pen tip 20 and joint 25 there is housed a trigger member (not shown) that energizes the ball 26 forward. The inside of the ink holding tube 14 is filled with the ink composition and a backflow preventer that prevents backflow of the ink composition, similar to the ball-point pen 100.

The trigger member may be a known type, such as one having a straight section (rod section) at one end of a metal small-gage wire spring, or a linear plastic piece.

The ball 26 held in the ball holder 24 of the ball-point pen tip 20 may be one made of a material such as sintered hard alloy, stainless steel, ruby or ceramic. The outer diameter of the ball 26 may be, for example, 0.1-2.0 mm.

An ink composition according to the invention is filled into the ink holding tube 14 of the ball-point pen 200. Since the ink composition exhibits both an excellent discharge property and high stability over time, the ball-point pen 200 produces no initial thin spots and allows drawing of stable, clear writing lines with metallic luster.

Figure 3:
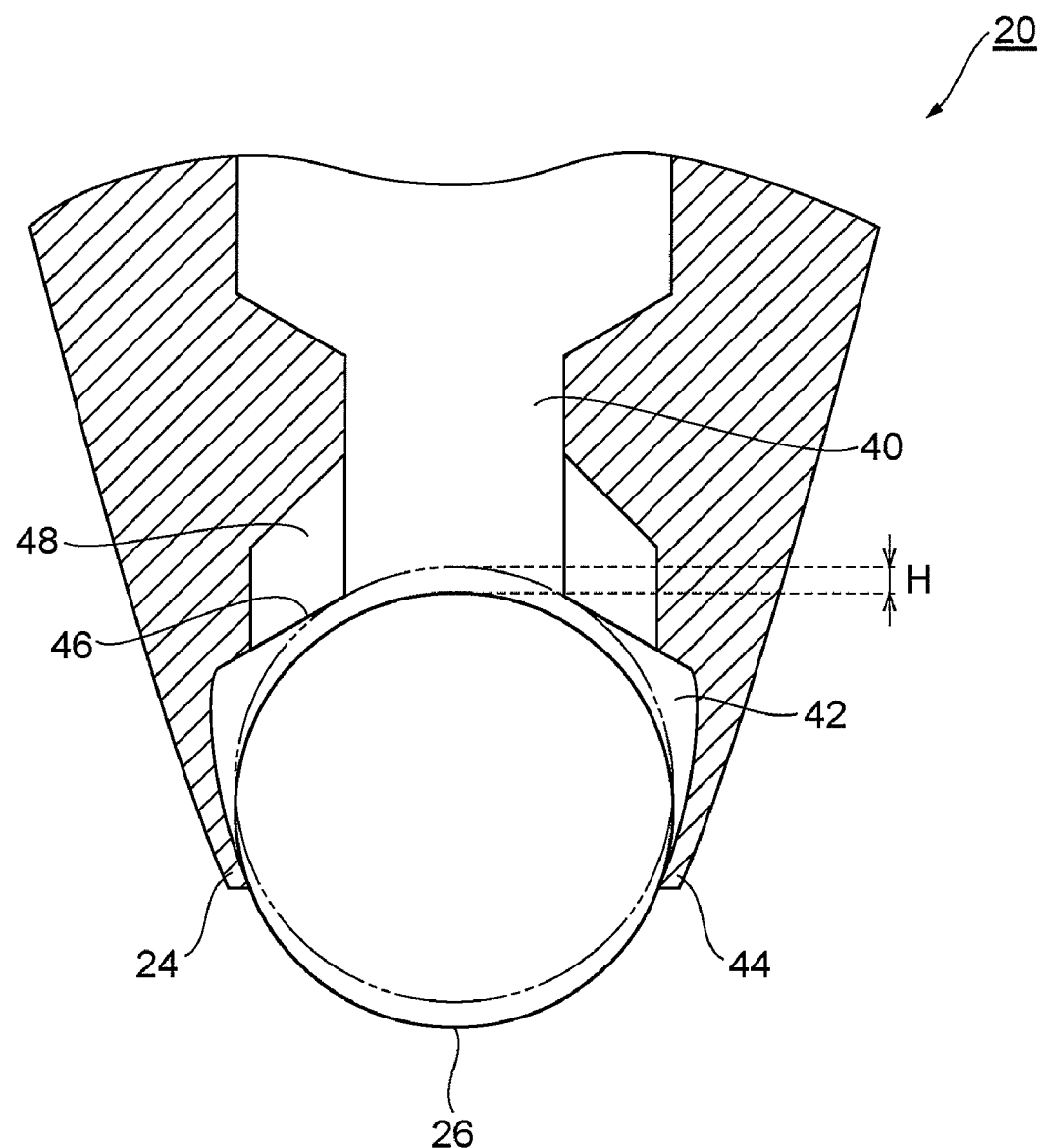
FIG. 3 is a schematic cross-sectional view showing a magnified portion of the longitudinal section of the ball-point pen tip 20 shown in FIG. 1 and FIG. 2.

FIG. 3 is a schematic cross-sectional view showing a magnified portion of the longitudinal section of the ball-point pen tip 20 shown in FIG. 1 and FIG. 2. In a non-writing position, the ball 26 housed in the ball-holding chamber 42 of the ball-point pen tip 20 is situated at the position shown by the solid line in FIG. 3 and is pressed against the inner edge of the tip of the ball holder 24 by the trigger member, which is not shown.

When the ball-point pen is used for writing, the ball 26 is pressed against the paper or other surface, and the ball 26 retreats to the position indicated by the long-dash-double-short-dash line in FIG. 3. That is, the ball 26 moves by the prescribed distance H and is pressed against the ball striker 46. This creates a gap (clearance) of a prescribed size between the ball 26 and ball holder 24 tip inner edge, so that the ink composition supplied from the ink passageway hole 40 through radial furrows 48 to the ball-holding chamber 42 is discharged out of the ball-point pen tip 20. Since it is extremely difficult to measure the clearance between the ball 26 and ball holder 24, clearance sizes can usually be compared by the moving distance H of the ball.

The moving distance H of the ball 26 in the ball-point pen tip 20 is preferably in the range of 20-100 μm. If the moving distance H of the ball 26 is less than 20 μm the clearance will be too small, tending to result in obstruction of the ink composition, and if the moving distance H of the ball 26 is greater than 100 μm the clearance will be too large, tending to result in drying of the ink composition inside the ball-point pen tip 20 and generation of more initial thin spots.

The ball-point pens 100, 200 of these embodiments house ink compositions according to the embodiments that exhibit both an excellent discharge property and excellent stability over time, and that can therefore be used in ball-point pens with different clearance sizes. For example, obstruction of the ink composition between the ball 26 and the ball holder 24 tip inner edge during writing can be adequately prevented even when the ball-point pen has a small clearance. Since the clearance size can therefore be smaller than when using conventional metallic color ink compositions, it is possible to draw distinct thin writing lines having metallic color. Furthermore, dry-up at the tip edge can be satisfactorily inhibited.

In addition, since the ink composition of this embodiment has an excellent shear thinning property, it is possible to satisfactorily prevent blotting and the like even with ball-point pens having large clearances. That is, the ink composition of this embodiment can be suitably used for writing tools with small clearance sizes and writing tools with large clearance sizes. Using such an ink composition, it is possible to obtain a writing tool that produces no initial thin spots or blotting, and allows writing to be accomplished with sufficient clarity for both thick writing lines and thin writing lines.

The ball-point pens 100, 200 of the embodiments with the constructions described above may be produced by the same production processes for ordinary ball-point pens, except for the ink composition used.

Preferred embodiments of an ink composition and a ball-point pen filled with the ink composition according to the invention were described above, but the ink composition and writing tool are not restricted to these embodiments. For example, the ball-point pen of this embodiment may lack the main body axis 18, and the ink holding tube 14 itself may serve as the main body axis. Also, the ball-point pen of this embodiment may have a pressing mechanism whereby the ink composition and backflow preventer in the ink holding tube 14 are pressed from the back end (the end opposite the ball-point pen tip 20). The ball-point pen of this embodiment may lack the backflow preventer 16.

The ink composition of the invention is not limited to use in ball-point pens, and may instead by used in marking pens including brush pens, or in writing tools that employ valve mechanisms at the ink injection sections.

EXAMPLES

The present invention will now be explained in greater detail based on examples and comparative examples, with the understanding that the invention is in no way limited to the examples.

Examples 1-11 and Comparative Examples 1-3

The starting materials shown in Tables 1 and 2 were added in the contents (mass %) shown in the same tables, and a dissolving agitator was used for 3 hours of stirring at room temperature (25° C.) and a rotational speed of 300 rpm. Ink compositions for Examples 1-11 and Comparative Examples 1-3 were obtained in this manner.

The details regarding the starting materials listed in Tables 1-2 are as follows.

Spherical resin fine particles: (LUMIKOL NKW-75E, trade name of Nihon Keiko, spherical resin fine particle content: 50 mass %, aqueous dispersion).
Humectant: GlycerinRG, trade name of NOF Corp.
Resin: HI-ROS X X-12, trade name of Seiko Kagaku Kogyo Co., Ltd.
Rust-preventive agent: COROMIN CB, trade name of Chelest Corp.
Antiseptic agent: SUROUT 99N, trade name of Japan EnviroChemicals, Ltd.
Lubricant: PLYSURF A-208S, trade name of Dai-ichi Kogyo Seiyaku Co., Ltd.
Gelling agent 1: Xanthan gum (ECHO GUM T, trade name of Dainippon Sumitomo Pharma Co., Ltd.).
Gelling agent 2: Xanthan gum (ECHO GUM T630, trade name of Dainippon Sumitomo Pharma Co., Ltd.).
Aluminum paste 1: SAP 5502SW, trade name of Showa Aluminum Powder, K.K., Al content: 65 mass %, Al mean particle size: 15 μm.
Aluminum paste 2: SAP CS430SW, trade name of Showa Aluminum Powder, K.K., Al content: 65 mass %, Al mean particle size: 9 μm.

Comparative Examples 4-6

Three different commercially available metallic ink compositions containing metal powder were prepared. Two of these ink compositions (commercial products 1 and 2) containing spherical resin fine particles were used for Comparative Example 4 and Comparative Example 5, respectively, and the ink composition containing no spherical resin fine particles (commercial product 3) was used for Comparative Example 6.

[Viscosity Measurement]

The viscosities of the ink compositions of the examples and comparative examples prepared as described above were measured in the following manner. Using a commercially available viscometer (US200, trade name of Paar Physica Co., Ltd.), the viscosities at different shear rates (V1 and V2) were measured after maintaining prescribed shear rates (1000 $s^{-1}$ and $0.01^1$) for 2 minutes at a temperature of 20° C. The cone used for measurement was the viscometer accessory MK23 (trade name, cone radius: r=25 mm, cone angle: θ=2°). The measurement results were as shown in Tables 1 and 2.

[Fabrication of Ball-Point Pens]

Ball-point pen structures were prepared having the structure shown in FIG. 1 and having ball-point pen tips each with a different clearance (moving distance H of the ball 26 in FIG. 3). The ink compositions of the examples and comparative examples were filled into the ink holding tubes (inner diameter: 4.0 mm) of the prepared ball-point pen structures to complete the ball-point pens.

[Evaluation of Discharge Property]

The fabricated ball-point pens were used for writing on paper, and the discharge property of each ink composition was evaluated in the following manner. The results were as shown in Tables 1 and 2.
A: Clear writing lines drawable from initial writing.
B: Blotting occurred, or irregular ink discharge.
C: Writing thin spots produced, not possible to draw clear writing lines.

[Evaluation of Stability Over Time]

The ink holding tube of each fabricated ball-point pen was placed in a centrifugal separator and centrifuged for 20 minutes at 400 G. The ink holding tube was then housed in the main body axis to complete the ball-point pen and used for writing on paper, and the stability over time of the ink composition was evaluated in the following manner. The results were as shown in Tables 1 and 2.
A: Clear writing lines drawable from initial writing.
B: Settling of aluminum particles caused uneven color in writing lines, or clogging prevented drawing of clear writing lines.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Colored fine particles | 25 | 20 | 35 | 30 | 20 | 25 | 25 | 20 | 25 |
| Humectant | 10 | 10 | 10 | 10 | 10 | 10 | 10 | 10 | 10 |
| Resin | 3 | 3 | 3 | 3 | 3 | 3 | 3 | 3 | 10 |
| Rust-preventive agent | 1.8 | 1.8 | 1.8 | 1.8 | 1.8 | 1.8 | 1.8 | 1.8 | 1.8 |
| Antiseptic agent | 0.3 | 0.3 | 0.3 | 0.3 | 0.3 | 0.3 | 0.3 | 0.3 | 0.3 |
| Lubricant | 1.8 | 1.8 | 1.8 | 1.8 | 1.8 | 1.8 | 1.8 | 1.8 | 1.8 |
| Gelling agent 1 | 0.4 | 0.4 | 0.4 | 0.4 | — | — | 0.4 | 0.4 | 0.4 |
| Gelling agent 2 | — | — | — | — | 0.5 | 0.5 | — | — | — |
| Aluminum paste 1 | 4 | 5 | 4 | 4 | 5 | 4 | — | — | 4 |
| Aluminum paste 2 | — | — | — | — | — | — | 4 | 5 | — |
| Ion-exchanged water | 53.7 | 57.7 | 43.7 | 48.7 | 57.6 | 53.6 | 53.7 | 57.7 | 46.7 |
| V1 (mPa · s) (*1) | 25 | 26 | 28 | 27 | 30 | 31 | 26 | 25 | 27 |
| V2 (Pa · s) (*2) | 142 | 137 | 185 | 154 | 111 | 171 | 139 | 141 | 146 |
| Discharge property 1 (90 μm) | A | A | A | A | A | A | A | A | A |
| Discharge property 2 (55 μm) | A | A | A | A | A | A | A | A | A |
| Discharge property 3 (40 μm) | A | A | B | B | B | B | B | B | B |
| Discharge property 4 (35 μm) | A | A | B | B | B | B | B | B | B |
| Discharge property 5 (30 μm) | A | A | B | B | B | B | B | B | B |
| Stability over time | A | A | A | A | A | A | A | A | A |

(*1): Viscosity at shear rate of 1000 $s^{-1}$
(*2): Viscosity at shear rate of 0.01 $s^{-1}$
*3: The numerical values in parentheses (μm) for the discharge properties are the ball moving distances H.

TABLE 2

| | Example 10 | Example 11 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Colored fine particles | 25 | 50 | 0 | 0 | 5 | Commercial product 1 | Commercial product 2 | Commercial product 3 |
| Humectant | 20 | 10 | 10 | 10 | 10 | | | |
| Resin | 3 | 3 | 3 | 3 | 2 | | | |
| Rust-preventive agent | 1.8 | 1.8 | 1.8 | 1.8 | 1.8 | | | |
| Antiseptic agent | 0.3 | 0.3 | 0.3 | 0.3 | 0.3 | | | |
| Lubricant | 1.8 | 1.8 | 1.8 | 1.8 | 1.8 | | | |
| Gelling agent 1 | 0.4 | 0.4 | 0.4 | 0.4 | 0.4 | | | |
| Gelling agent 2 | — | — | — | — | — | | | |
| Aluminum paste 1 | 4 | 4 | 5 | 4 | 5 | | | |
| Aluminum paste 2 | — | — | — | — | — | | | |
| Ion-exchanged water | 43.7 | 28.7 | 77.7 | 78.7 | 73.7 | | | |
| V1 (mPa·s) (*1) | 32 | 41 | 18 | 18 | 20 | 121 | 53 | 21 |
| V2 (Pa·s) (*2) | 144 | 205 | 51 | 52 | 80 | 417 | 248 | 63 |
| Discharge property 1 (90 μm) | A | A | A | A | A | A | A | A |
| Discharge property 2 (55 μm) | A | A | A | A | A | A | A | A |
| Discharge property 3 (40 μm) | B | B | C | C | B | C | C | B |
| Discharge property 4 (35 μm) | B | B | C | C | C | C | C | C |
| Discharge property 5 (30 μm) | B | B | C | C | C | C | C | C |
| Stability over time | A | A | B | B | B | A | A | B |

(*1): Viscosity at shear rate of 1000 s$^{-1}$
(*2): Viscosity at shear rate of 0.01 s$^{-1}$
*3: The numerical values in parentheses (μm) for the discharge properties are the ball moving distances H.

Based on the results shown in Table 1 and Table 2, it was confirmed that an ink composition comprising metal powder, a gelling agent and spherical resin fine particles, and having a viscosity (V1) of no greater than 45 mPa·s at a shear rate of 1000 s$^{-1}$ and a viscosity (V2) of at least 100 Pa·s at a shear rate of 0.01 s$^{-1}$, exhibits an excellent discharge property even with a small ball-point pen tip clearance, and also exhibits excellent stability over time.

What is claimed is:

1. An ink composition for a writing tool, comprising:
   a metal powder;
   a gelling agent; and
   spherical resin fine particles;
   wherein the viscosity (V1) at a shear rate of 1000 s$^{-1}$ is no greater than 45 mPa·s and the viscosity (V2) at a shear rate of 0.01 s$^{-1}$ is at least 100 Pa·s.

2. An ink composition for a writing tool according to claim 1, wherein the mean particle size of the metal powder is 5-20 μm.

3. A writing tool comprising the ink composition according to claim 2.

4. A writing tool according to claim 3, which comprises an ink holding tube and a ball-point pen tip provided at the end of the ink holding tube, and which has the ink composition in the ink holding tube.

5. An ink composition for a writing tool according to claim 1, wherein the mean particle size of the spherical resin fine particles is 0.05-1 μm.

6. A writing tool comprising the ink composition according to claim 1.

7. A writing tool according to claim 6, which comprises an ink holding tube and a ball-point pen tip provided at the end of the ink holding tube, and which has the ink composition in the ink holding tube.

* * * * *